Jan. 2, 1951   R. W. MAY   2,536,070
SHAFT POSITIONING APPARATUS
Filed June 7, 1946   4 Sheets-Sheet 1
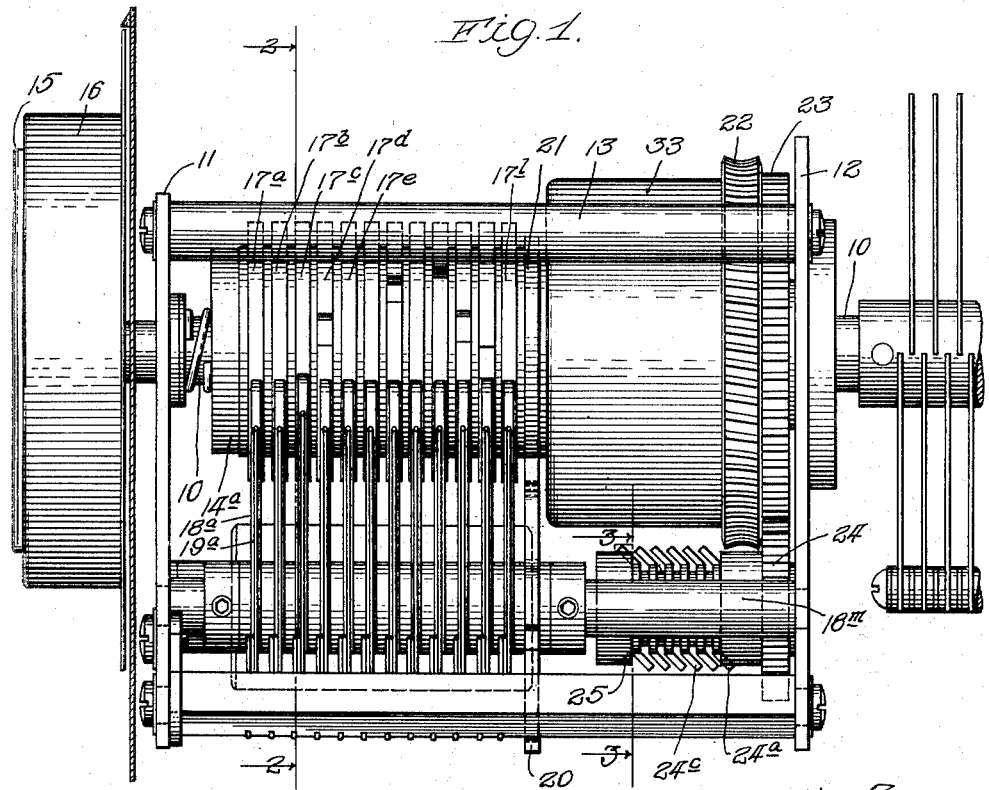
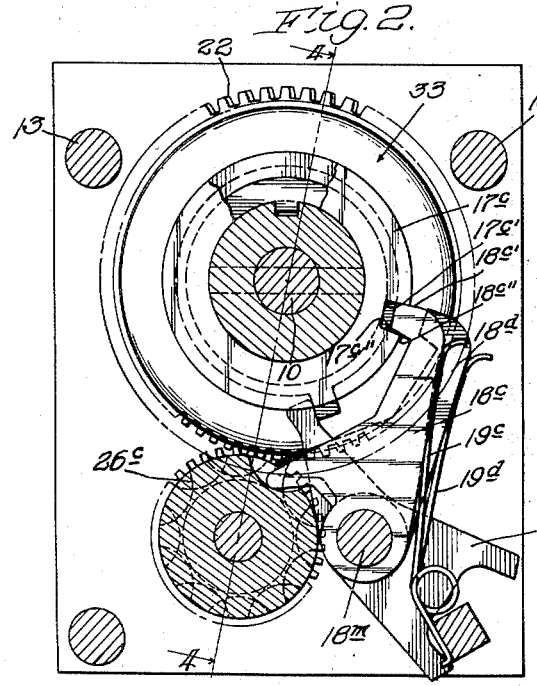
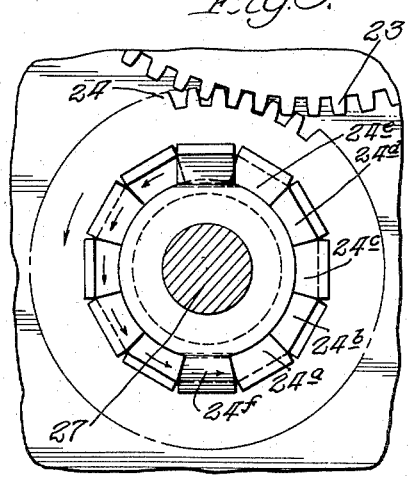
Inventor:
Richard W. May,
By Chritton, Schroeder,
Merriam & Wofgren, Attys.

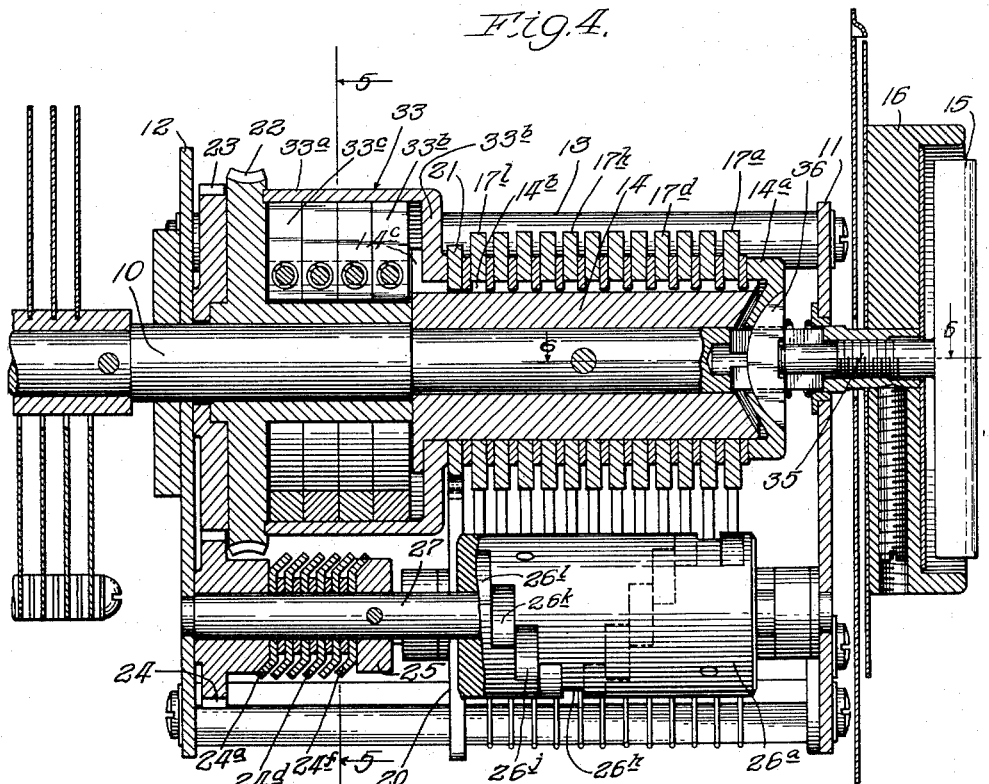
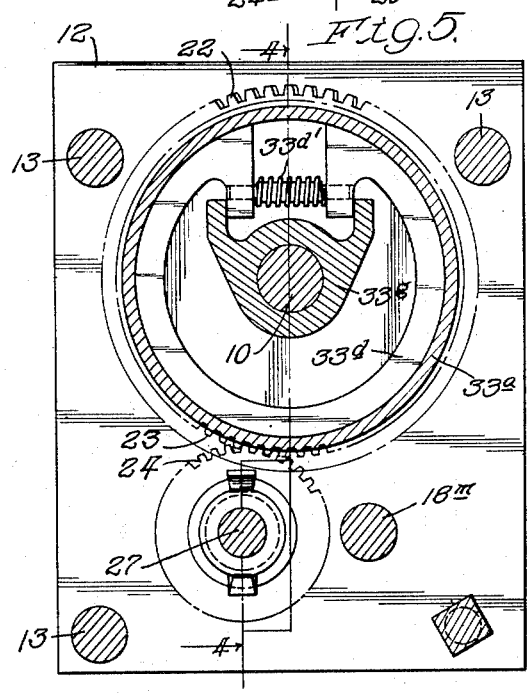
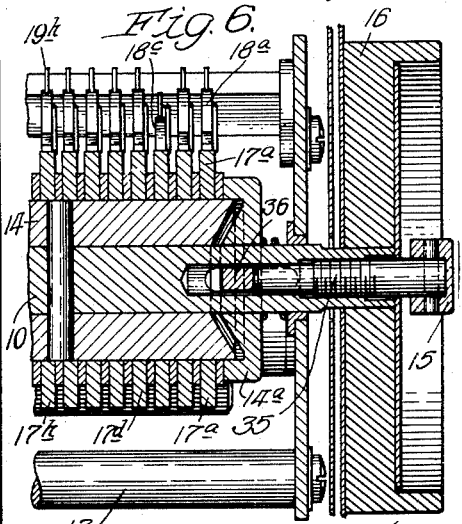

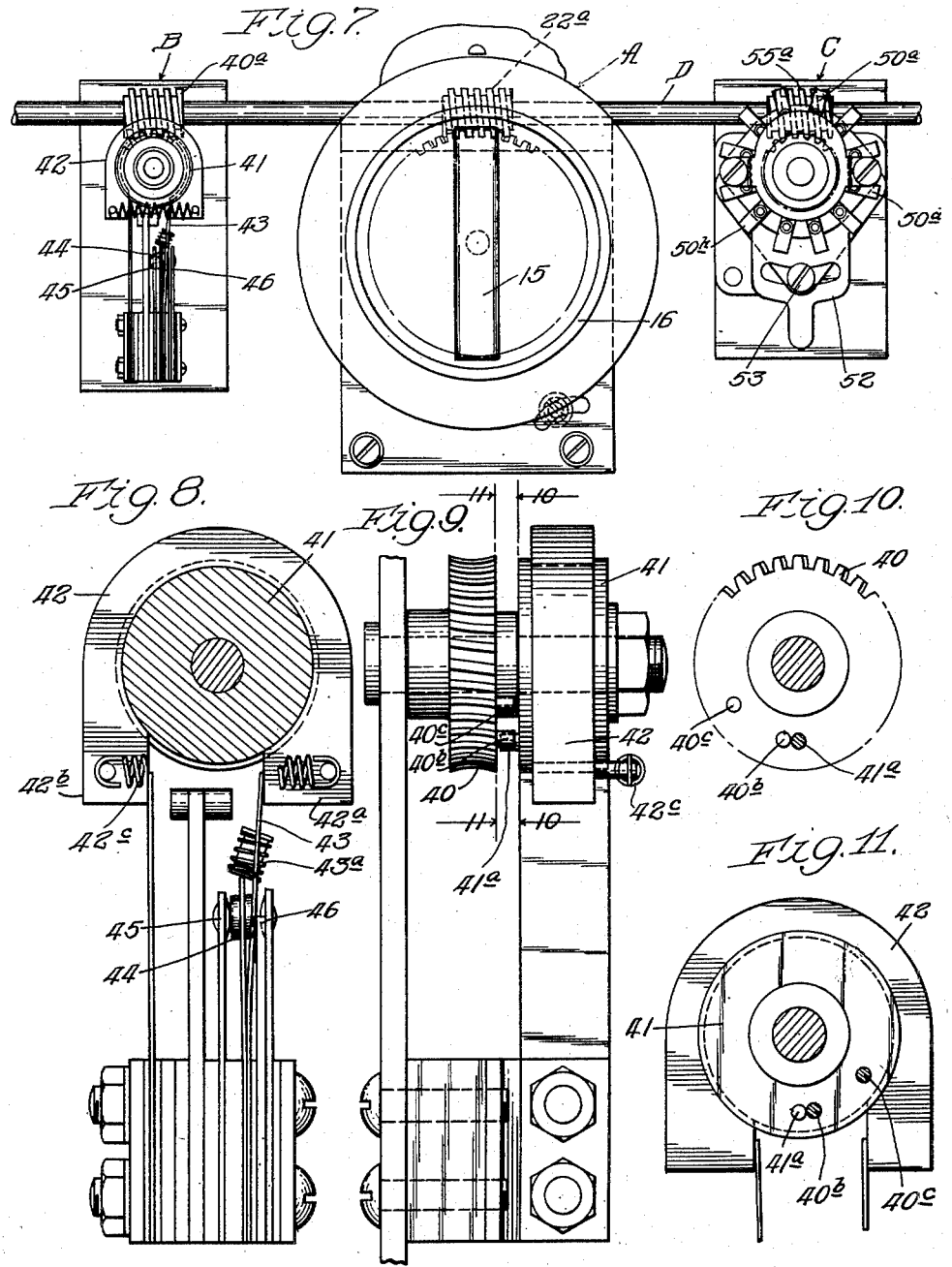

Jan. 2, 1951   R. W. MAY   2,536,070
SHAFT POSITIONING APPARATUS
Filed June 7, 1946   4 Sheets-Sheet 4
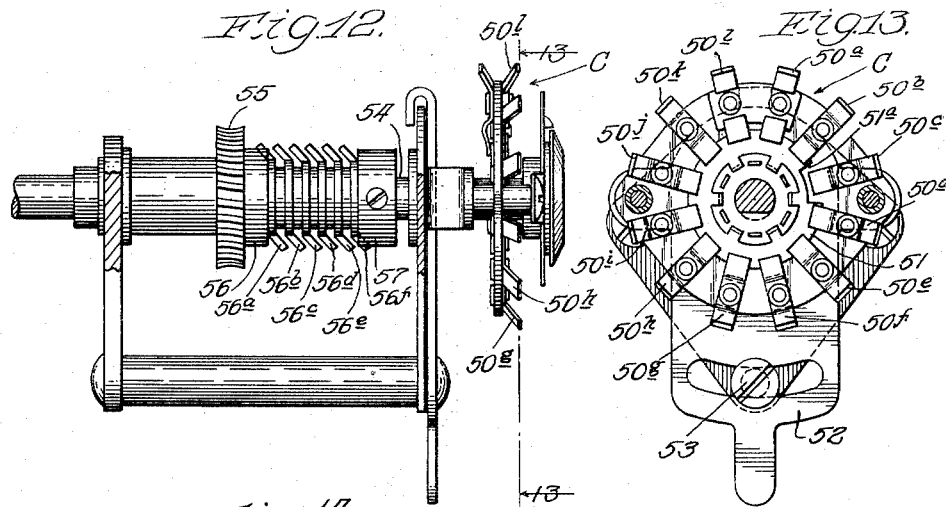
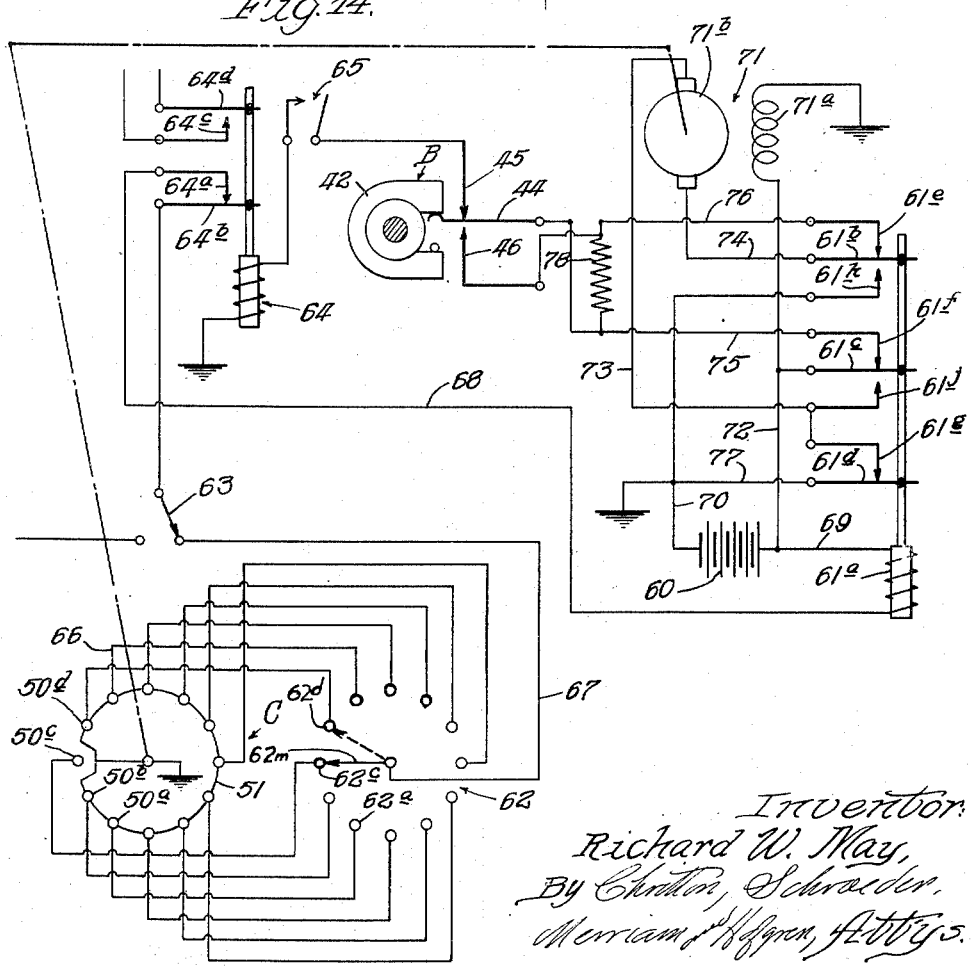
Inventor:
Richard W. May,
By Chitton, Schraeder,
Merriam & Hofgren, Attys.

Patented Jan. 2, 1951

2,536,070

UNITED STATES PATENT OFFICE 2,536,070

SHAFT POSITIONING APPARATUS

Richard W. May, Cedar Rapids, Iowa, assignor to Collins Radio Company, a corporation of Iowa Original application December 22, 1943, Serial No. 515,250. Divided and this application June 7, 1946, Serial No. 674,984

5 Claims. (Cl. 74—10.2)

This invention relates to shaft positioning apparatus, and more particularly to improvements in apparatus especially designed for automatic tuning of radio equipment.

One feature of this invention is that it provides means for disconnecting the tuned shaft from the automatic drive means when adjustments are being made of the stop members mounted on the shaft; another feature of this invention is that it enables new tuning positions to be set up or selected with great ease; still another feature of this invention is the provision of a new drive arrangement for the selecting means; yet another feature is that the selecting means, and more particularly the selector switch, operates for only a brief period of each tuning cycle of operation of the mechanism; a further feature of this invention is that the selector switch may be arranged in a separate unit from the remainder of the tuning apparatus; still a further feature of this invention is the provision of cooperating stop ring and pawl surfaces arranged with an angle of cooperation such that the pawl will hold the stop ring in position during set-up operations, but will be automatically forced up out of the slot upon initiation of an automatic tuning operation; and yet a further feature of this invention is the use of a curved stop surface on the portion of the stop element cooperating with the stop ring. Other features and advantages of this invention will be apparent from the following specification and the drawings, in which:

Figure 1 is a side elevational view of positioning apparatus embodying this invention; Figure 2 is a transverse sectional view along the line 2—2 of Figure 1; Figure 3 is a partial sectional view along the line 3—3 of Figure 1; Figure 4 is a view along the line 4—4 of Figure 5; Figure 5 is a transverse sectional view along the line 5—5 of Figure 4; Figure 6 is a fragmentary sectional view along the line 6—6 of Figure 4; Figure 7 is a front elevational view of an operative combination comprising a limit switch, a tuning unit, and a selector switch; Figure 8 is an enlarged detail view, partly in section, of the limit switch; Figure 9 is a side elevational view of the limit switch; Figure 10 is a fragmentary view along the line 10—10 of Figure 9; Figure 11 is a fragmentary view along the line 11—11 of Figure 9; Figure 12 is a side elevational view of the selector switch; Figure 13 is a sectional view of the selector switch, along the line 13—13 of Figure 12; and Figure 14 is a circuit diagram.

This application is a division of my Patent No. 2,512,644. The improvements to which the present application is principally directed comprise an improved shape of the stop ring slot and the cooperating pawl end.

The apparatus illustrated and described here contains improvements in automatic tuning devices of the kind shown in various patents heretofore issued to Arthur A. Collins, as for example Collins Patent No. 2,285,414, which issued June 9, 1942; and in various copending applications of the said Arthur A. Collins and of myself. In automatic tuning devices of this type the tuning element shaft is connected to a drum on which are rotatably mounted a plurality of stop rings having stop shoulders adapted to cooperate with stop elements or pawls. There are a similar number of pawls and stop rings, each combination providing a stop assembly adapted to automatically stop the shaft at any predetermined position by engagement of the stop shoulder with the cooperating pawl.

In operation, a drive motor, through appropriate intermediate connections usually incorporating a line shaft, rotates the stop ring drum in one direction until the drum has reached a terminal position where it stops, the drive then continuing operation further (slipping a clutch provided for this purpose) until a selector cam drum and a selector switch reach a position determined by the electrical circuit selected. Thereupon the drive motor reverses and the drum and tuning shaft are driven in the other direction until the operative pawl (selected by the position in which the selector cam drum stopped) engages the stop shoulder of its cooperating ring, whereupon the tuning shaft is stopped at the desired preselected position. The drive motor and driving connections again continue rotation further (through the action of the slip-clutch) until the cycle of operation is terminated by a limit switch.

In operation the stop rings must, of course, be fixedly mounted in desired position on the stop ring drum, and means must be provided for locking them in such position. When it is desired to change the selection of frequencies to which the radio equipment is automatically tunable, the stop rings must be released and permitted rotational movement on the drum to enable setting up or selection of the new stopping positions of the shaft. A novel means for effecting the desired locking and unlocking, and for operating the locking means from the front of the dial, has recently been devised by said Arthur A. Collins and is claimed in his application Serial No. 472,717, filed January 18, 1943, this locking means being shown in the apparatus illustrated here.

When the locking means has been unlocked or released and the stop rings are movable on the shaft, a new position is selected by rotation of the shaft, the stop ring being held in place during such rotation by cooperation with its associated pawl, the stop combinations being rendered operative and adjusted to a new position, when desired, one at a time. Since the power-operated drive means is stationary during this set-up operation, the shaft could be manually turned only by overcoming the resistance of the slip-clutch, and causing it to slip, in the absence of means for disconnecting the drive. Where the automatic tuning apparatus is designed for heavy duty use, the slip-clutch must provide considerable driving torque, and this renders it difficult to manually rotate the shaft during set-up operations. Accordingly, I have devised an arrangement whereby releasing of the locking means simultaneously disconnects the shaft from the automatic or power operated drive means, so that the tuning shaft may be freely and easily rotated manually during set-up operations.

In automatic tuning apparatus heretofore recently used, and shown in detail in the above mentioned Collins application 472,717, the cam drum and selector switch are caused to start rotating immediately upon initiation of a tuning cycle, the selector cam positively withdrawing the pawl from its cooperating slot in the stop ring. This requires considerable rotation of the selector switch, many times more turns of rotation than would otherwise be necessary, with resultant undue wear on such switch. I have devised and am here disclosing and claiming an arrangement whereby the pawls and stop rings retain their desired association during set-up operations, yet are automatically disengaged by reason of rotation of the tuning shaft upon initiation of a tuning cycle; and having provided an improved drive arrangement for the selector means, and more particularly the selector cam and selector switch, such that neither of these elements operates until the tuning shaft has reached its terminal or home position, whereupon the selector elements operate briefly to effect the desired selection, and then remain stationary during the remainder or tuning portion of the cycle of operation.

Inasmuch as the construction and general operation of automatic tuning apparatus analogous to that illustrated here has been described in considerable detail in the aforementioned Collins Patent 2,285,414, and in other copending applications directed to other features, it will be described more briefly here. In so far as the general operation and uses of such apparatus are concerned, the present specification is intended to provide only sufficient detail to enable understanding thereof, since reference may be had to the above-mentioned patents or to other previously issued Collins patents on automatic tuning devices for a more full description of such general operation; but the novel features to which this application is particularly directed will be described with more detail.

Figure 7 illustrates an operative combination for automatically positioning a tuning shaft at any desired point within a single revolution, this comprising as its principal parts a main operating or tuning unit here identified as A and supplemental units forming part of the means for selecting the stop combination to be operative in the main unit, these here being shown as comprising a limit switch unit B and a selector switch unit C. The selector switch unit may also be used for effecting changes in the circuit condition, if desired, since it assumes different positions always related to one of the preselected positions to which the main tuning shaft will be positioned by the operating unit A. For example, switching of crystals for different transmission frequencies may be effected by a switch connected to the shaft of the selector switch C. Its principal function, however, is concerned with selection of the desired stop combination in the main tuning unit. All of these units are driven from a single drive means, which may comprise a reversible electric motor operative through a line shaft here identified as D. The details of the construction of the main operating unit A are shown in Figures 1–6; the limit switch B is shown in more detail in Figures 8–11; the selector switch and its drive are further shown in Figures 12 and 13; and Figure 14 is a diagram of an operative circuit for the system.

Referring now more particularly to Figures 1–6, it will be seen that the parts cooperating to effect automatic positioning of the shaft of a condenser or other tuning element, as the shaft 10, are arranged in a self-contained unit mounted between the end plates 11 and 12 held in appropriate relationship by the posts 13. A drum 14 is fixedly mounted on the shaft 10, this drum having a longitudinally but non-rotatably movable forward portion 14a adapted to be moved longitudinally of the shaft by means operative by a manually rotatable bar 15 on the face of the tuning dial 16. The drum carries any desired number (here shown as 12) of tuning stop rings, these being here identified as 17a—l. Appropriate non-rotatable spacer washers are provided between these stop rings, both the rings and washers being axially movable on the drum. When the end portion 14a of the drum is moved to the right (speaking with respect to the position of the parts as shown in Figure 4) the stop rings are loosened and unlocked and may be individually set to desired positions; and when the end portion 14a of the drum is moved to the left, with considerable force, the stop rings are locked or clamped in the selected positions.

A plurality of tuning positioning pawls or stop elements 18a—l are provided, the shape and location of these pawls being best seen from consideration of the pawl 18c shown in Figure 2. Each pawl has its operating end urged toward the cooperating stop ring by one of a similar number of springs 19. When a pawl is rendered operative by the selecting mechanism, its end moves in toward the stop rings and rides upon the surface of the cooperating stop ring until the slot therein is reached, whereupon the pawl end drops into the slot and stops the ring (and thus the tuning element shaft 10), as may be best seen in Figure 2. Stopping of the stop ring drum 14 in either of its two terminal positions, approximately 360° apart, is effected by cooperation between a terminal stop pawl 20 and an appropriate lug portion on a terminal stop ring 21, this ring being keyed to the drum.

Rotation of the stop ring drum is effected by a drive motor and line shaft, as previously mentioned, having driving connection with the gear 22, as through the worm 22a shown in Figure 7. As may be best seen in Figure 4, the gear 22 is mounted coaxially with the shaft 10; but it is freely rotatable about such shaft. It is rigidly connected to a gear 23 which drives the gear 24, the driving element of a lost motion connection having a driven element 25, these two elements being spaced but coaxial. This driven element is connected to and rotates the selector cam drum carrying a plurality of selector cams 26a—l. These cams are 12 in number, and have depressions in their periphery, the arrangement being such that the depressions are equally spaced about the periphery of the drum (as may be best seen in Figure 4), so that they form a helix therearound. The selector cam drum is rigidly mounted on a shaft 27 pinned to the driven element 25 and serving as a bearing member for the driving element 24.

In operating the device to automatically select a new tuning position, the operator selects a certain circuit by a manually rotatable switch or other type of switch, as a telephone-type dial switch. A motor relay starts the drive motor and drives the gear 22 in a direction such as to rotate the main shaft and stop ring drum counter-clockwise (as viewed in Figure 2) until the shaft is stopped in terminal or home position by cooperation of the terminal stop ring 21 and terminal stop pawl 20. The drive then continues further, rotating the selector cam drum and selector switch, until the open-circuit portion of the rotatable member of the selector switch reaches the contact or tap corresponding to the selected circuit, whereupon the motor relay holding circuit is opened and relay operation causes the drive motor to reverse. The drive is then in such a direction that the stop ring rotation is clockwise (as viewed in Figure 2), the selector cam drum being left standing at the selected position by operation of the lost motion driving connection. When the stop ring reaches the position shown in Figure 2 the pawl end drops into place in the stop ring slot and the tuning element shaft 10 is positively stopped by engagement of the stop shoulder with the stop element (speaking with respect to the parts of the stop combination selected by the selector cam), the motor then continuing operation of the drive means until a limit switch finally terminates the cycle.

In order to enable this over-running action of the drive at both ends of the movement of the stop ring drum, a slip-clutch is provided in the driving connection between the gear 22 and the shaft 10. As may be best seeen by an examination of Figure 4, the clutch includes a cup-like member 33, comprising a cylindrical drum portion 33a and an inwardly extending end portion 33b. Within the drum portion are a plurality of friction shoe units here identified as 33c—f, these friction shoes having their ends normally urged apart, so as to expand them into frictional engagement with the drum 33a, by springs 33c'—f'. A yoke member 33g is rotatably mounted on the shaft 10 and rigidly connected to the gear 22.

As may be best seen in Figure 5, rotation of the gear exerts a driving force on one or the other end of the friction shoes; and this force is transmitted frictionally from the outer surface of the shoes 33c—f to the drum 33a. The force transmitting arrangement is such that rotation of the gear tends to pull the ends of the shoe in away from the drum, this resulting in a more uniform slip point or maximum torque. The slip-clutch operates, of course, as a torque limiting arrangement; and it is designed to transmit any desired given torque to the shaft 10 and the stop ring drum, and to slip when this desired maximum torque is exceeded.

Referring now more particularly to Figure 4, it will be seen that the stop rings 17 are rotatable on the drum 14, while the intermediate spacing washers are keyed to this drum by portions lying in the slot 14b. The locking bar 15 comprises the actuating end of a stud having the shaft portion 35 threaded into an opening in the end of the shaft 10. The inner end of the threaded shaft 35 is received in a recess in and bears against a pressure member 36 slidably but non-rotatably movable with respect to the shaft 10, this member bearing against the movable member 14a of the stop ring drum. It will be apparent that rotation of the locking bar 15 in a direction screwing the stud into the shaft 10 (preferably clockwise) forces the end 14a of the drum to the left (speaking with respect to the position of the parts in Figure 4) and clamps the stop rings against the flange 14c at the left-hand end of the stop ring drum, the friction between the stop rings and the spacing washers locking the stop rings immovably in place when the locking arrangement is drawn up tight.

When it is desired to change the position of one or more of the rings, it is only necessary to back the locking bar off slightly in unlocking direction (merely a half turn or so) whereupon the clamping pressure is sufficiently released to enable the rings to be changed to new positions. This is readily done by actuating the automatic tuning mechanism so that the device goes through its automatic tuning cycle and leaves the particular stop combination which it is desired to re-set (or initially set up) in the position shown in Figure 2. It is then only necessary to loosen the locking bar and manually rotate the shaft 10 by use of the dial 16, this resulting in rotating the shaft without rotating the stop ring, held in position by its cooperating pawl, so that there is relative movement between the shaft and the stop ring. If the dial is held in the desired position, tightening the locking means again by rotation of the locking bar results in selection or determination of a new tuning position for the particular stop combination thus adjusted.

Since the drive arrangement connected to the gear 22 is immovable during this manual rotation of the shaft 10, I have found that it is preferable to provide means for disconnecting the shaft from the power-operated drive arrangement during setting up or adjusting of the positions of the stop rings. I accomplish this in a very satisfactory and effective method by providing what is in effect another connecting clutch associated with the slip-clutch 33, and actuated by and in accordance with operation of the stop ring locking means. As may be best seen in Figure 4, the cup-like element of the slip-clutch has its end portion 33b lying between the back flange 14c of the stop ring drum and the first stop ring at this end, here identified as 21. Operation of the stop ring locking means to locked or clamping position, therefore, clamps the end part 33b against the flange 14c and connects the stop ring drum and shaft 10 to the drive means. On the other hand, releasing of the stop ring locking means also releases or unclamps the portion 33b, so that the shaft 10 and stop ring drum are freely rotatable with respect to the cup-like member when the locking arrangement is in released position. This provides a compact and simple connecting and disconnecting arrangement which uses the cup-like member both as the drum element of the slip-clutch and as one of the elements of a friction or connecting clutch. This disconnecting feature is particularly desirable in connection with heavy duty equipment, where manual force running up in the neighborhood of 5 to 10 pounds of torque on the periphery of the dial might otherwise be necessary to slip the slip-clutch 33.

Referring now more particularly to Figures 8–11, the mechanical construction of the limit switch will be briefly described, its electrical operation being described in connection with the circuit diagram. A gear 40, driven by a worm 40a on the line shaft D, makes lost motion connection with a drum 41, this connection being through engagement of a pin 40b or 40c with a pin 41a mounted in the drum 41. A friction shoe 42 encircles the drum 41 and is in frictional engagement therewith, the lower ends of this shoe being pulled together, as may be best seen in Figure 8, by a spring 42c. When the line shaft has just rotated in such a direction as to cause engagement between the pin 40b and 41a (as shown in Figures 10 and 11), the limit switch would stand in the position shown in Figure 8. On the other hand, when the cycle of operation is nearing its end, the pin 40c comes around into engagement with the pin 41a, resulting in clockwise rotation of the drum 41 (as viewed in Figure 8) whereupon the end 42a of the friction shoe 42 moves the operating element 43 of the limit switch, operating with a snap action (through the spring 43a) to throw the movable contact 44 out of engagement with the contact 45 and into engagement with the contact 46. This terminates one cycle of operation and leaves the system in condition for the next cycle.

Referring now more particularly to Figures 12 and 13, the selector switch C is shown as comprising a plurality of taps or contacts 50a—l equally spaced around a central rotatable member 51, this member having a slot or open circuit portion here identified as 51a and shown adjacent the contact 50c. The movable contacts are mounted on a member rigidly connected to and carried by an adjustable member 52, this member being movable with respect to the main frame of the selector switch and adjustable to a desired position, the proper position being maintained by tightening down a stud 53 extending through a slot in the member 52, as may be best seen in Figure 13. The rotatable member 51 is carried on and driven by a shaft 54, this shaft being rigidly connected to the driven element of a lost motion connection. Referring more particularly to Figure 12, a gear 55 is adapted to be driven by a worm on the line shaft, identified as the worm 55a, and this is rigidly connected to the driving element 56 of the lost motion connection, the driven element 57 being spaced from but coaxial with the driving element.

The lost motion driving connection used in the selector switch exactly corresponds to that used to drive the selector cam drum, the latter lost motion connection being best seen in Figure 4. Intermediate the driving and driven elements 24 and 25 are a plurality of eared washers 24a—f; and intermediate the driving and driven elements 55 and 57 are a plurality of similar eared washers 56a—f. The first of such washers is in each case fastened to the driving element and the last of such series of washers is connected to the driven element; and the intermediate washers are freely rotatable, the washers all being separated by spacers. The washers illustrated are provided with ears or lugs on opposite sides (180° apart), and bent in the opposite directions. When the washers are all in the position shown in Figure 12, for example, rotation of the driving element 55 and the washer 56 can take place for nearly a turn without rotation of any other element; but then the ear of the washer 56a shown at the bottom in Figure 12 comes in contact (after its rotation for approximately a turn) with the oppositely bent ear shown at the top of the next washer 56b, and thereupon such washer starts to move. These two washers then move for nearly a turn before the next washer 56c starts to turn, and so on until finally the driven element is rotated. This enables the driving element to make more than one complete revolution, generally two or three revolutions in practice, without rotation of the driven element.

In operation of the automatic tuning system, reversal of the motor for operation of the drive means in the tuning direction backs off the lost motion connections, without movement of the selector switch or stop ring drum, until the cycle of operation has been completed, it being necessary that the lost motion connections have sufficient lost motion for this purpose. When the next cycle of operation is initiated, the drive means rotates in the other or homing direction without initial movement of the selector switch or selector cams, merely taking up the slack in the lost motion drive until the shaft has reached home position and the clutch has started to slip. When the drive means has operated long enough to have rotated the shaft through one complete revolution, all of the slack is taken out of the lost motion driving connection and the selector switch and cam drum start to rotate, this rotation being in synchronism because of the similarity of the two lost motion connections. Such selecting rotation continues until the movable member 51 reaches a position where its slot is adjacent the energized contact, as the contact 50c, whereupon the drive means reverses and the tuning portion of the cycle takes place, the selector switch and selector cam remaining unmoved during this portion of the operation by virtue of the lost motion driving connections. This arrangement enables the selector switch and selector cam drums to be in separate units, if desired, it only being necessary that the lost motion connections be similar in operation; and results in the selector switch rotating less than one full revolution in each tuning cycle, since it does not start to rotate until the system is ready for the selecting operation.

Inasmuch as the selector cam drum does not start rotating immediately upon initiation of a tuning cycle, it cannot be used to withdraw the pawl from the slot of the stop ring with which it cooperated on the previous tuning cycle. In order to solve the problem thus presented, I have devised an improved shape of the stop ring slot and the cooperating end of the pawl. Referring more particularly to Figure 2, it will be seen that the pawls 18 are all carried by and rotatable on a pawl shaft here identified as 18m. In order to facilitate entry of the pawl into the slot in the stop ring, and to ensure the same positioning of the shaft even if the distances of entry differ in different tuning cycles, I form the outer or stop end 18c' of the pawl 18c with a curvature having the axis of the shaft 18m as its center; and have this portion cooperate with a radial stop shoulder, or stop edge 17c' of the stop ring slot. The surfaces 17c' and 18c' are the surfaces which come into engagement during the tuning operation and which stop the shaft at the selected position, and it is for that reason that these are termed the stop surfaces. On the other hand, when a new tuning cycle is initiated, the stop ring 17c rotates in a counter-clockwise direction (speaking with respect to Figure 2) and the other surface 17c'' must act upon the other edge 18c'' to withdraw the pawl or force it out of the slot, these being termed the withdrawing surfaces. The width of the slot and of the end of the pawl are preferably so proportioned that the pawl can never drop fully down to the bottom of the slot, but assumes a stopping position as shown in Figure 2. This ensures close engagement between the stopping surfaces on the one hand and the withdrawing surface on the other hand; and enables adjusting of the tuning position, during set-up operations, by rotation of the shaft 10 in either direction to the desired position, without any lost motion.

In order to have the pawl remain in the slot and hold the stop ring 17c stationary despite the small frictional drag on it occasioned by rotation of the shaft 10 during set-up operations, the arrangement of the withdrawing surfaces must be such that withdrawal does not take place as a result of this relatively low force. On the other hand, when the stop rings are locked up and automatic tuning operations are taking place, the force resulting from the drive through the slip-clutch 33 must be sufficient to result in withdrawal of the pawl of the previously energized stop combination, so that a force within the torque limitation of the slip clutch must effect withdrawal of the pawl. If the pawl and stop ring be considered as having no friction between the withdrawing surfaces, the desired angle $a$ made by the surface 18c'' with a radius of the stop ring to the point of contact may be found from the following formula:

$$a = \text{arc tan} \frac{C - A \sin B}{A \cos B}$$

Where $C$ is the inward force exerted on the end of the pawl by the spring 19, $A$ is the tangential force developed by the stop ring rotation, and $B$ is the angle between such tangential force (the tangent to the stop ring at the point of contact) and a line running from such point of contact through the axis of the shaft 18m. Since there is a certain amount of friction between the cooperating withdrawing surfaces, however, the friction angle or angle of repose for the materials used must be taken into consideration and the correct formula for the angle between the withdrawing surface of the pawl and the stop ring radius to the point of contact is as follows:

$$a = \text{arc tan} \frac{C - A \sin B}{A \cos B} + 0$$

where 0 is the friction angle. In the case of an actual embodiment of this invention which I have constructed, the tangential force at the periphery of the stop ring was selected as 3.2 pounds, the particular slip-clutch used providing considerable margin of torque over this tangential force; the springs used provided an inward force of .375 pound on the end of the pawl; the angle between a tangent at the point of contact and a line from the point of contact to the pawl shaft was 11°; and the withdrawing surfaces were both steel, resulting in a friction angle of 8.5 degrees. Calculation, by use of the formula last set forth above, showed that the angle $a$ should have a value of +4.25° (minus 4.25° plus 8.5°). Giving the withdrawing surface of the pawl this angle with respect to the stop ring radius at the point of contact (as illustrated in the drawings) resulted in sufficient holding force for all set-up operations and for proper adjustment of the stop rings on the shaft with movement of the shaft in either direction, together with immediate and automatic withdrawal of the pawl upon initiation of a tuning operation, when the stop rings were locked in place. That is, the pawl would stay in the slot when the torque at the periphery of the stop ring was less than 3.2 pounds, but would withdraw from the slot when this force was exceeded.

Referring now more particularly to the circuit diagram, Figure 14, a battery 60 is illustrated as representative of any appropriate source of power for the motor and relays. The motor control relay 61 has an actuating coil 61a, three movable switch members 61b—d, three "upper" contacts 61e—g, and two "lower" contacts 61h and 61j. This motor control relay and the limit switch B, in conjunction with the selector switch arrangement C, operate to achieve the desired electrical sequence of operations.

A manual selector switch, identified in general as 62, is here shown as having 12 taps 62a—l wired to the corresponding switch points 50a—l of the automatic rotatable selector switch, the manual switch arm 62m being adapted to engage any one of the 12 switch points and thus to complete a circuit to any one of the corresponding automatic selector switch contacts. The local-remote switch 63 is shown in a position enabling control by the manual selector switch. A relay 64 has cooperating contacts 64a and 64b which form part of the control circuit of the tuning system, and other contacts 64c and 64d which control some other circuit condition, as carrier emission. This relay and the switch 65 (which may be a key or a microphone button) provide an interlocked action preventing operation of the set while the automatic tuning device is in operation, and vice versa.

Assuming that the parts are in the position shown in Figures 1–13 of the drawing and it is desired to select another frequency setting, movement of the switch arm 62m might be made to the contact 62d, as shown in dotted line position. This movement completes a circuit from ground through the rotatable element 51 of the selector switch, contact 50d, wire 66, contact 62d, arm 62m, wire 67, switch 63, contacts 64a and 64b (it being assumed that the switch 65 is open), wire 68, motor relay coil 61a, wire 69, battery 60, and wire 70 back to ground. This energizes the motor control relay and causes its movable switch elements 61b—d to move from the position shown to their lower positions. This energizes the reversible drive motor 71 by a circuit from the ungrounded side of the battery through the wire 72. The field 71a of the motor is constantly energized; and in this relay position the armature is energized by a circuit including contacts 61c and 61j, the wire 73 to the upper end of the armature, and a return circuit from the lower terminal of the armature through the wire 74, the contacts 61b and 61h and the wire 70 to the grounded side of the battery 60. This effects rotation of the motor in the "home" direction, lifting the pawl 18c out of the slot in the cooperating stop ring. At the same time the limit switch member 42 opens the circuit between the contacts 44 and 45, ensuring against operation of the set until the tuning cycle is complete, and brings the movable contact 44 into engagement with the contact 46. When the shaft 10 has reached home position the lost motion drive connections initiate rotation of the selector switch and selector cam. As soon as the switch member 51 reaches a position such that its slot is opposite the contact 50d, the motor control relay circuit is de-energized and the motor stops and immediately reverses, movement of the parts in the other direction leaving the selector cams and selector switch stationary in positions corresponding to the selector tap 50d.

Deenergization of the motor relay coil 61a causes return of its movable contacts 61b—d to the position shown in the drawing, completing another circuit to the motor armature in such a way as to cause its operation in the opposite direction. This circuit leads from the ungrounded side of the battery through the wire 72, the contacts 61c and 61f, the wire 75, the limit switch contacts 46 and 44, the wire 76, contacts 61b and 61e, and the wire 74 to the lower armature terminal; and from the upper armature terminal through the wire 73, the contacts 61d and 61g, and the wire 77 back to the grounded side of the battery, it being noted that the connections to the armature terminals are now reversed with respect to the batttery. This causes movement of the mechanical parts in the tuning direction, this continuing until the tuning shaft is stopped by the selected stop combination, and continuing further (with the clutch 33 slipping) until the limit switch 42 opens engagement between the contacts 44 and 46. A bridging resistor 78 may be associated with these contacts to provide a small current keeping the pawl in firm engagement with the stop shoulder of its cooperating stop ring, this force being insufficient to slip the slip-clutch 33.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In apparatus for positioning a rotatable shaft having selector means, stop means of the character described, including: reversible, torque-limiting drive means adapted to rotate the shaft and adapted only briefly to operate the selector means; a stop ring movably mounted on said shaft and having a slot therein; locking means adapted selectively to prevent or permit rotation of said shaft with respect to the ring; and a pivotally mounted pawl having an end portion adapted to be received by the slot to effect the desired stopping, the surface of the pawl end opposite the stopping surface when the pawl is in stopping position, making an angle with a radius of the stop ring through its point of contact therewith such that withdrawal of the pawl end from the slot is effected only by a substantial rotational force applied to the stop ring, in excess of the frictional force existing between the shaft and the stop ring when the locking means permit movement of the shaft with respect to the stop ring, but a force within the torque limits of said drive.

2. In apparatus for positioning a rotatable shaft, stop means of the character described, including: a stop ring mounted on said shaft and having a slot therein; means for locking said ring nonrotatably on said shaft during said positioning operation; means for releasing said locking means to permit said ring to rotate with respect to said shaft when a frictional drag is exceded; and a pivotally mounted pawl having an end portion adapted to be received by the slot to effect the desired stopping, the construction being such that withdrawal of the end portion of the pawl from the slot is effected by a rotational force in excess of said frictional drag and of predetermined value exerted by the stop ring, but only when such force is at least as great as said predetermined value.

3. In apparatus for positioning a rotable shaft, stop means of the character described, including: a stop ring mounted on said shaft and having a radial slot therein; means for locking said ring nonrotatably on said shaft during said positioning operation; means for releasing said locking means to permit said ring to rotate with respect to said shaft when a frictional drag is exceeded; and a pivotally mounted pawl having an end portion adapted to be received by the slot to effect the desired stopping, the stopping surface of the pawl end comprising an arc concentric with the axis of the pivotal movement of the pawl, and the surface of the pawl end opposite the stopping surface when the pawl is in stopping position making an angle of less than 10° with a radius of the stop ring through its point of contact therewith, withdrawal of the end portion of the pawl from the slot being effected by a rotational force in excess of said frictional drag and of predetermined value exerted by the stop ring, but only when such force is at least as great as said predetermined value.

4. In apparatus for positioning a rotatable shaft, stop means of the character described, including: reversible, torque-limiting drive means adapted to rotate the shaft; a stop ring mounted on said shaft and having a slot therein; means for locking said ring nonrotatably on said shaft during said positioning operation; means for releasing said locking means to permit said ring to rotate with respect to said shaft when a frictional drag is exceeded; and a pivotally mounted pawl having an end portion adapted to be received by the slot to effect the desired stopping, the surface of the pawl end opposite the stopping surface when the pawl is in stopping position making an angle with a radius of the stop ring through its point of contact therewith such that withdrawal of the pawl end from the slot is effected only by a substantial rotational force applied to the stop ring, said force being greater than said frictional drag but within the torque limits of said drive.

5. Apparatus of the character claimed in claim 4, wherein said slot is radial and the stopping surface of the pawl end comprises an arc concentric with the axis of pivotal movement of the pawl.

RICHARD W. MAY.

REFERENCES CITED

The following references are of record in the file of this patent:

UNITED STATES PATENTS

| Number | Name | Date |
| --- | --- | --- |
| 1,408,929 | Clay | Mar. 7, 1922 |
| 2,244,541 | Marvel | June 3, 1941 |
| 2,285,414 | Collins | June 9, 1942 |
| 2,378,941 | May | June 26, 1945 |
| 2,391,470 | May | Dec. 25, 1945 |

Certificate of Correction

Patent No. 2,536,070

January 2, 1951

RICHARD W. MAY

It is hereby certified that error appears in the printed specification of the above numbered patent requiring correction as follows:

Column 1, line 55, for the patent number "2,512,644" read *2,512,664*; and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*